UNITED STATES PATENT OFFICE.

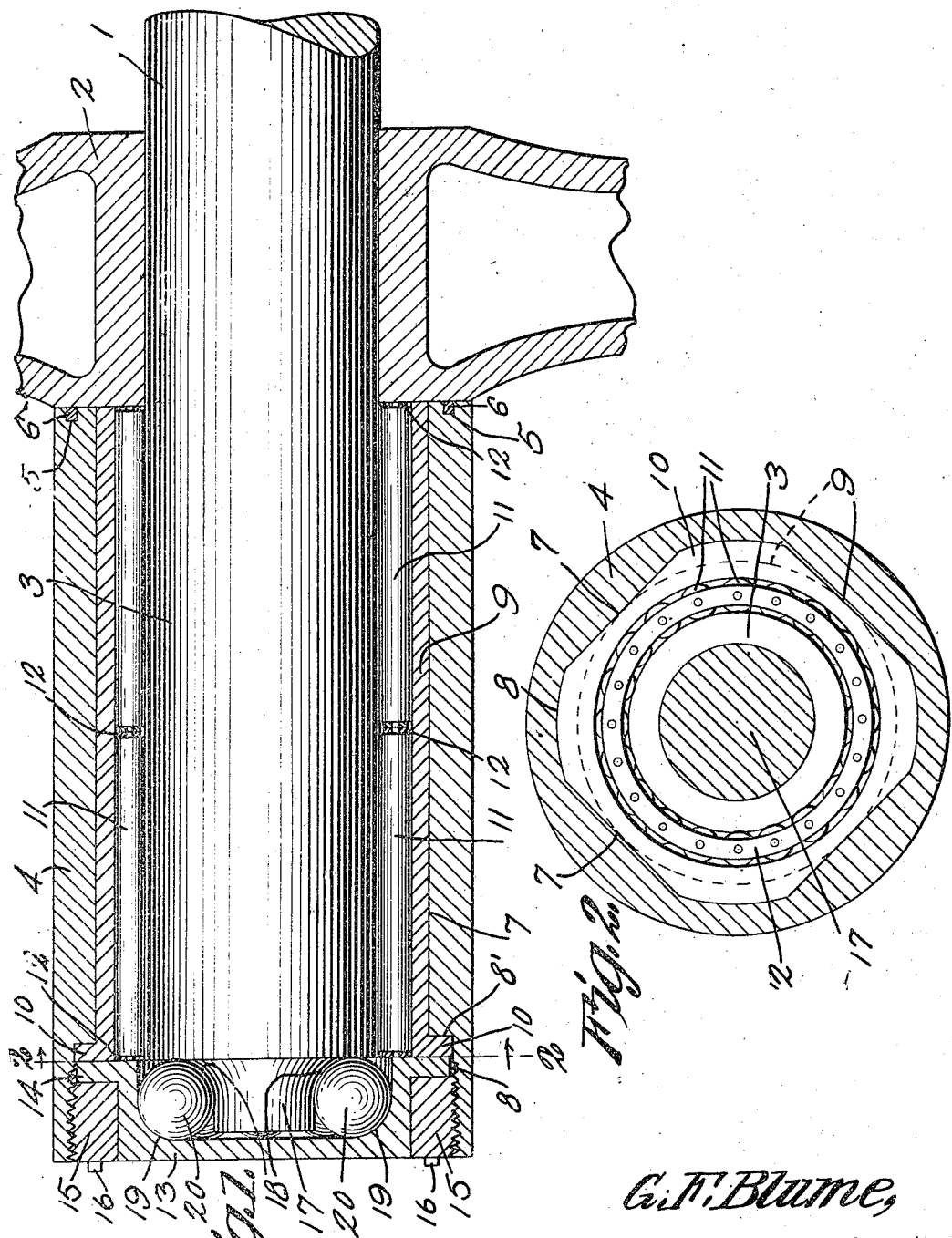

GEORGE FRED BLUME, OF RICHMOND, INDIANA.

JOURNAL-BEARING.

1,227,992. Specification of Letters Patent. Patented May 29, 1917.

Application filed January 16, 1917. Serial No. 142,723.

*To all whom it may concern:*

Be it known that I, GEORGE F. BLUME, a citizen of the United States, residing at Richmond, in the county of Wayne and State of Indiana, have invented a new and useful Journal-Bearing, of which the following is a specification.

The present invention appertains to journal bearings, and aims to provide a novel and improved bearing of that character adapted especially for use upon steam and electric railway cars, although useful for various other purposes.

It is the object of the invention to provide a journal bearing having novel means for taking care of the end thrust at the end of the axle or journal.

Another object of the invention is to provide a journal bearing having the improvements above noted, and which at the same time, is comparatively simple, compact and inexpensive in construction, and durable and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a diametrical section of the bearing, portions being shown in elevation.

Fig. 2 is a cross section taken on the line 2—2 of Fig. 1.

In the drawing, there is illustrated an axle 1 having secured thereon the wheel 2 and provided at the outside of said wheel with the usual journal 3 projecting within a suitable journal box 4. The inner end of the journal box is provided with a groove 5 in which a packing ring 6 is seated to bear against the wheel 2 and exclude dust, grit and other extraneous matter from the bearing, and to retain oil therein. The journal box 4 is provided with a bore 7 extending from end to end, and is further provided with a counter bore 8 at the outer end of the bore 7 providing an outwardly facing shoulder 8'.

A bearing shell or sleeve 9 is slipped longitudinally within the bore 7, and is provided at its outer end with an outturned flange 10 of non-circular outline, as seen in Fig. 2, that portion of the counter bore 8 adjacent to the shoulder 8' being of similar outline to snugly receive the flange 10 and prevent the shell 9 from turning. The flange 10 seats against the shoulder 8'. Two sets of bearing rollers 11 are disposed between the journal 3 and shell 9, their ends being reduced and engaged with rings 12, whereby to hold the rollers in proper operative position.

An end thrust member or cup 13 is disposed within the counter bore 8 with its recess facing the end of the journal, and the rim of the cup 13 is provided with an outturned flange 14 of the same outline as the flange 10, whereby to prevent the cup 13 from turning within the journal box 4, the flange 14 seating against the flange 10, as seen in Fig. 1. A retaining ring 15 is threaded within the counter bore 8 and fits rotatably upon the cup 13, said ring bearing against the flange 14 to clamp the flanges 10 and 14 between the shoulder 8' and retaining ring 15, thereby holding the shell 9 and cup 13 in place firmly. The ring 15 can be provided with outstanding lugs 16 or other suitable means for applying and removing it.

The end of the axle or its journal is reduced to provide a stud 17 within the cup 13, there being a fillet between the sides of the stud and the shoulder formed by the stud, which provides an annular ball race 18. The inner corner of the cup 13 has a fillet providing an annular ball race 19 confronting the ball race 18, and an annular series of anti-frictional balls 20 are disposed between the ball races 18 and 19 and between the shoulder of the journal 3 and the central portion of the cap 13.

The rollers 12 will take up the lateral strain, while the balls 20 will take up the end thrust, it being understood that one of the thrust bearings is used for each end of the axle. The cup 13 not only provides a ball cup, but also provides a cap closing the outer end of the journal box 4.

Having thus described the invention, what is claimed as new is:—

1. A bearing embodying a journal box, a journal projecting into it, a ring engaged removably within the journal box, a ball cup fitted within and held by said ring and having a portion bearing against the inner portion of the ring to hold the cup in place, and anti-frictional balls between said journal and the interior of the cup.

2. A bearing embodying a journal box, a journal projecting into it having a reduced end providing a shoulder, a ring engaged removably within the journal box, a ball cup fitted snugly within said ring and having an outturned flange at its edge seated against the inner side of said ring to hold the cup in place, and anti-frictional balls between said shoulder and cup within said cup.

3. A bearing embodying a journal box, a journal projecting into it and having a reduced end providing a shoulder, a ball cup within the journal box having an outturned flange of non-circular outline fitted within the journal box to prevent rotation of said cup therein, anti-frictional balls between said shoulder and cup around said reduced end, and a ring surrounding said cup, bearing against the flange thereof and engaged removably within the journal box.

In testimony that I claim the foregoing as my own, I have hereto affixed my signature in the presence of two witnesses.

GEORGE FRED BLUME.

Witnesses:
HAROLD A. DEXTER,
W. A. MANCHESTER.